(12) United States Patent
Hulsken (10) Patent No.: US 10,091,445 B2
(45) Date of Patent: Oct. 2, 2018

(54) SCANNING IMAGING SYSTEM WITH A NOVEL IMAGING SENSOR WITH GAPS FOR ELECTRONIC CIRCUITRY

(71) Applicant: KONINKLIJKE PHILIPS N.V., Eindhoven (NL)

(72) Inventor: Bas Hulsken, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 289 days.

(21) Appl. No.: 15/104,597

(22) PCT Filed: Dec. 15, 2014

(86) PCT No.: PCT/EP2014/077661
§ 371 (c)(1),
(2) Date: Jun. 15, 2016

(87) PCT Pub. No.: WO2015/091300
PCT Pub. Date: Jun. 25, 2015

(65) Prior Publication Data
US 2016/0373678 A1    Dec. 22, 2016

(30) Foreign Application Priority Data
Dec. 16, 2013   (EP) ..................... 13197416

(51) Int. Cl.
*H04N 5/374*    (2011.01)
*H04N 5/369*    (2011.01)
(Continued)

(52) U.S. Cl.
CPC ......... *H04N 5/3743* (2013.01); *G02B 21/002* (2013.01); *G02B 21/365* (2013.01); *H04N 5/369* (2013.01)

(58) Field of Classification Search
CPC .... H04N 5/3743; H04N 5/369; G02B 21/365; G02B 21/002
See application file for complete search history.

(56) References Cited

U.S. PATENT DOCUMENTS 5,646,427 A   7/1997 Smith
5,742,058 A   4/1998 Pantigny
(Continued)

FOREIGN PATENT DOCUMENTS

JP    200124948 A    1/2001
JP    2001298177 A    10/2001
(Continued)

*Primary Examiner* — Padma Haliyur (57) ABSTRACT

An imaging sensor comprising a 2D array of pixels in an XY coordinate system with gaps for electronic circuitry is presented. Furthermore, a scanning imaging system for imaging an oblique cross section of a sample with such a sensor is provided. Especially when the imaging sensor is in a tilted configuration this sensor is of specific advantages. The sensor allows for maximizing the photoactive part of the pixels in the photosensitive area of the sensor which leads to a maximized the fill factor. Furthermore this leads to a very light sensitive sensor and hence microlenses can be avoided. The gap or gaps of the imaging sensor facilitate also a faster read out because more circuitry can be positioned on the imaging sensor within the gap.

14 Claims, 5 Drawing Sheets (51) Int. Cl.
*G02B 21/00* (2006.01)
*G02B 21/36* (2006.01)

(56) References Cited

U.S. PATENT DOCUMENTS

| | | | |
|---|---|---|---|
| 6,593,954 B2 * | 7/2003 | Ishihara | B41J 2/473 |
| | | | 347/233 |
| 7,130,115 B2 | 10/2006 | Olszak | |
| 2003/0193589 A1 | 10/2003 | Lareau | |
| 2010/0134673 A1 | 6/2010 | Masuda | |
| 2012/0287256 A1 * | 11/2012 | Hulsken | G02B 21/361 |
| | | | 348/79 |
| 2012/0293645 A1 | 11/2012 | Maddison | |
| 2013/0057931 A1 | 3/2013 | Mayer | |
| 2014/0125776 A1 * | 5/2014 | Damaskinos | G02B 21/365 |
| | | | 348/50 |

FOREIGN PATENT DOCUMENTS

| | | |
|---|---|---|
| JP | 2010212288 A | 9/2010 |
| WO | 2001084209 A2 | 11/2001 |
| WO | 2011080670 A1 | 7/2011 |

\* cited by examiner

SCANNING IMAGING SYSTEM WITH A NOVEL IMAGING SENSOR WITH GAPS FOR ELECTRONIC CIRCUITRY

CROSS-REFERENCE TO PRIOR APPLICATIONS

This application is the U.S. National Phase application under 35 U.S.C. § 371 of International Application No. PCT/EP2014/077661, filed on Dec. 15, 2014, which claims the benefit of European Patent Application No. 13197416.4, filed on Dec. 16, 2013. These applications are hereby incorporated by reference herein.

FIELD OF THE INVENTION

The present invention relates to the field of imaging a sample, and applies advantageously in the field of digital pathology.

In particular, the present invention relates to an imaging sensor comprising a 2D array of pixels, a scanning imaging system for imaging an oblique cross-section of a sample and the use of an imaging sensor in a digital scanning microscope.

BACKGROUND OF THE INVENTION

Figure 1:
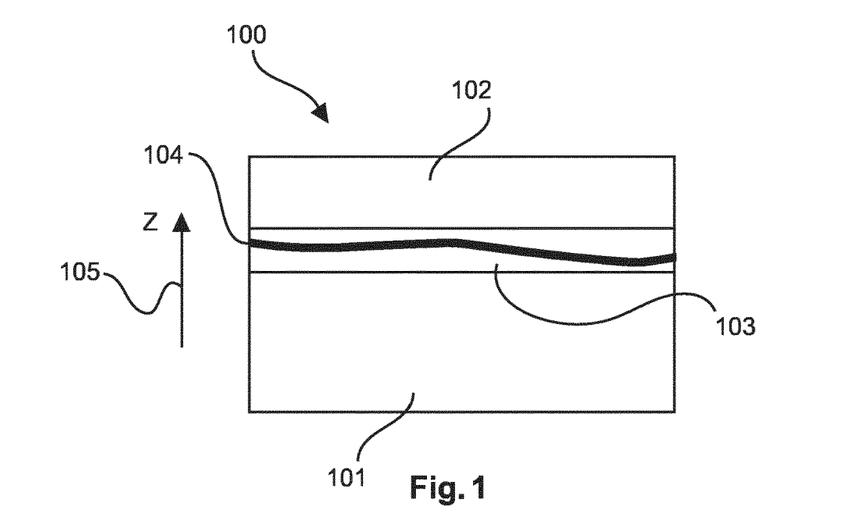
FIG. 1 schematically shows a cross-section of a microscope slide.

A digital scanning microscope usually makes a digital image of a sample such as a tissue sample placed in a microscope slide. This is typically done by scanning the sample over the whole microscope slide and stitching different image spans together and/or by overlaying images measured at different wavelengths. FIG. 1 schematically represents a cross-section 100 of such a microscope slide. A glass slide 101, a cover slip 102 and a mounting medium 103 for fixing and sealing off a sample 104, like e.g. a biological tissue layer, are comprised. It is known, for example, from WO 2001/084209, that digital scanning microscopes can comprise a 2D line sensor, also known as a line scan camera or as a linear array sensor. Such sensors comprise only one line, said differently one row, of sensing pixels. It is also known that compared to other types of sensors, like 2D array sensors, for example, 1D line sensors are able to provide better continuous mechanical scanning operation, less stitching problems, and can allow for the use of so-called time delay integration (TDI) line sensors.

Furthermore, current imaging sensor designs provide photoactive pixels which consist of photosensitive parts, i.e. photodiodes, and also comprise non-photosensitive parts like a plurality of charge to voltage converters (CVC) are embedded in the pixel itself leading to a lower fill factor. This means that the pixel typically has three transistors (rolling shutter) of four transistors (global shutter) for the CVC and both vertical and horizontal metal lines for addressing and read out are needed. However, such non-photosensitive parts of the pixel reduce the fill factor of the pixel which is especially harming during low light conditions. The resulting low light sensitivity of pixels in a conventional sensor is typically overcome by applying micro lenses. Such micro lenses try to effectively focus less amount of light onto the pixels of the imaging sensor such that the collateral loses are minimized. In addition, currently available imaging sensors provide for a relative low speed in reading out the region of interest (ROI) as only a limited number of read out electronics can be provided within the limited space of a given pixel size.

SUMMARY OF THE INVENTION

The inventors of the present invention have realized that the use of microlenses is particularly not suitable when the imaging sensor is tilted with respect to the optical path, which is applied often, inter alia, in digital pathology. Moreover, the inventors of the present invention have found that scanning and imaging the sample with a tilted sensor leads to an oversampling in Z direction such that only particular areas of the imaging sensor need to be used for image capturing. The inventors found an advantageous way relocate the read out electronics of the pixels at positions/regions of the sensor that—when used in a tilted configuration—are not needed as photosensitive regions. Therefore, the present invention proposes specific non-photosensitive gaps between pixel lines of the sensor. Hence, a remarkable increase of the fill factor of the pixels is achievable by the present invention. This results in an increased low light sensitivity of the imaging sensor and thus an improved image quality can be achieved. Moreover, the imaging sensor of the present invention facilitates a faster read out because in total more circuitry can be positioned on the sensor within the gap or gaps, which gaps are the non-photosensitive area of the imaging sensor, consequently leading to a faster imaging sensor.

The object of the present invention may be seen as providing a scanning imaging system comprising an improved imaging sensor.

The object of the present invention is solved by the subject-matter of the independent claims. Further embodiments and advantages of the invention are incorporated in the dependent claims.

The described embodiments similarly pertain to the scanning imaging system with the improved imaging sensor and the use of an scanning imaging system.

According to an exemplary embodiment of the present invention, a scanning imaging system having an optical axis along the Z direction and comprising an imaging sensor comprising a 2D array of pixels in an orthogonal XY coordinate system is provided, the Z direction is perpendicular to the Y direction. The 2D array of pixels of the imaging sensor comprises a first pixel line which comprises a plurality of pixels. The first pixel line extends along the Y direction of said XY coordinate system. Furthermore, a second pixel line is comprised by the imaging sensor which second line comprises a plurality of pixels. Also the second pixel line extends along the Y direction. The 2D array of pixels further comprises a first non-photosensitive gap between the first and the second pixel lines. Read out electronics of some or all pixels of the first pixel line and/or of some or all pixels of the second pixel line are positioned in the first non-photosensitive gap. Further, each pixel of the image sensor includes a photodiode, the imaging sensor comprises read out lines along the X direction configured to read out and address the respective photodiode, and the imaging sensor is tilted around the Y axis as an axis of rotation.

In other words, a scanning imaging system with a novel image sensor configuration or design is presented in which first and second pixel lines are separated by a non-photosensitive gap filled with the logic and connective circuitry of the sensor. For example, the charge to voltage converters (CVC) of some or of all pixels can be positioned in the gaps, which are non-photoactive regions, instead of positioning the CVCs in photoactive regions of the sensor. Such a CVC free pixel configuration according to the present invention can be gathered from the exemplary pixel example 600 in FIG. 6, in contrast to a conventional pixel 601. The imaging sensor of the present invention may comprise or may also consist entirely of pixels which are of the type shown as example pixel 600. In any case, the imaging sensor of the present invention comprises one or more gaps along the Y direction and between the pixel lines allowing to move the read out electronics, as, for example, the CVCs, away from the pixel lines and into said non-photosensitive gaps.

Figure 4:
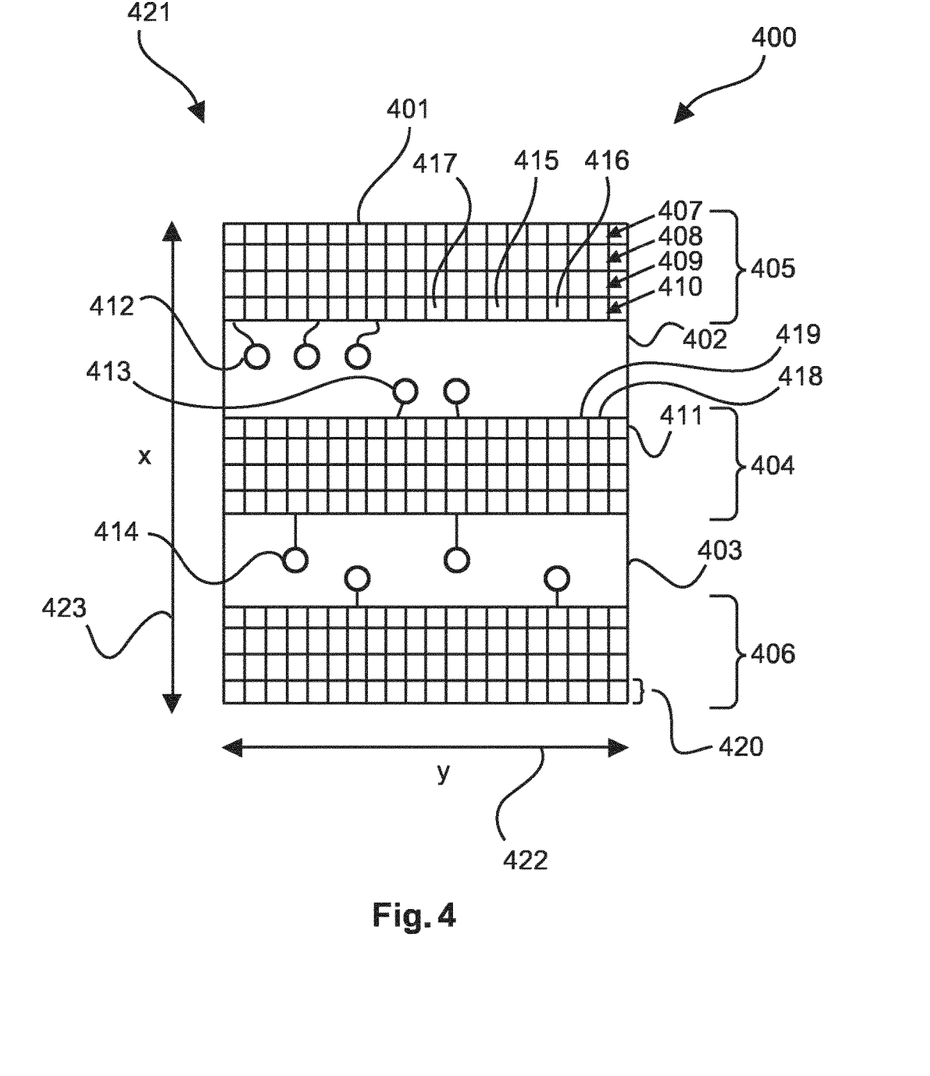
FIG. 4 schematically shows an imaging sensor using TDI principles according to an exemplary embodiment of the present invention.

Of course, the imaging sensor of the present invention may have a large plurality of pixel lines, if desired they can also be positioned contiguously and adjacently to build a block of pixel lines, and may also have a large plurality of gaps. The gaps typically separate at least two pixel lines or separate two blocks of pixel lines. FIG. 4 shows an embodiment with several blocks of pixel lines and non-sensitive gaps in between. The above mentioned first and second pixel lines can then be part of different blocks. Such blocks may be used and controlled by a control module to carry out the know technique of time delay integration (TDI).

The improvement of the imaging sensor of the present invention over a conventional two-dimensional sensor of the same size and resolution achieved by this novel imaging sensor is at least two-fold. First, the imaging sensor of the present invention allows for maximizing the photoactive part of the pixels in the photosensitive area of the sensor which corresponds to a maximization of the fill factor. This allows for a very light sensitive sensor without micro lenses and has advantageous applications in configurations where the imaging sensor is tilted. Avoiding microlenses is important for placing the sensor tilted in the optical path, as a tilt of microlenses is not optimal with respect to the light propagation through the microlenses. Second, the gap or gaps of the imaging sensor allow for a faster read out because more circuitry can be on the imaging sensor within the gap. Not only the CVCs of the pixels can be placed there but also other additional components that increase the read out speed. This allows for a faster sensor and thus for a faster image generation. Hence, the present invention makes use of non-photosensitive space which can extend over the whole breath of the sensor in Y direction and which can extend over at least one pixel width in X direction. These spaces, i.e., the gaps, are located between the photosensitive lines, e.g. the first and second pixel lines.

As will become apparent from and elucidated with various explanations hereinafter, the first and second pixel lines may be part of TDI blocks, i.e. a block of adjacent or adjacently positioned lines of pixels along the Y direction, in which configuration such TDI blocks are separated by gaps which do not comprise photodiodes. Those gaps are used to integrate the CVCs, the logic and/or connective circuitry of pixels of the sensor. It should be noted that in the context of the present invention, the term 2D array of pixels shall not be understood as a surface which is completely covered with photosensitive pixels. Much more the 2D array of pixels of the present invention, in line with the exemplary embodiment shown in FIG. 4, provides for photosensitive pixel lines and comprises regions, i.e., non-photosensitive gaps, which are used for integrating said read out electronics of the photosensitive pixels. This become apparent from and elucidated with different embodiments of the present invention hereinafter.

Figure 3:
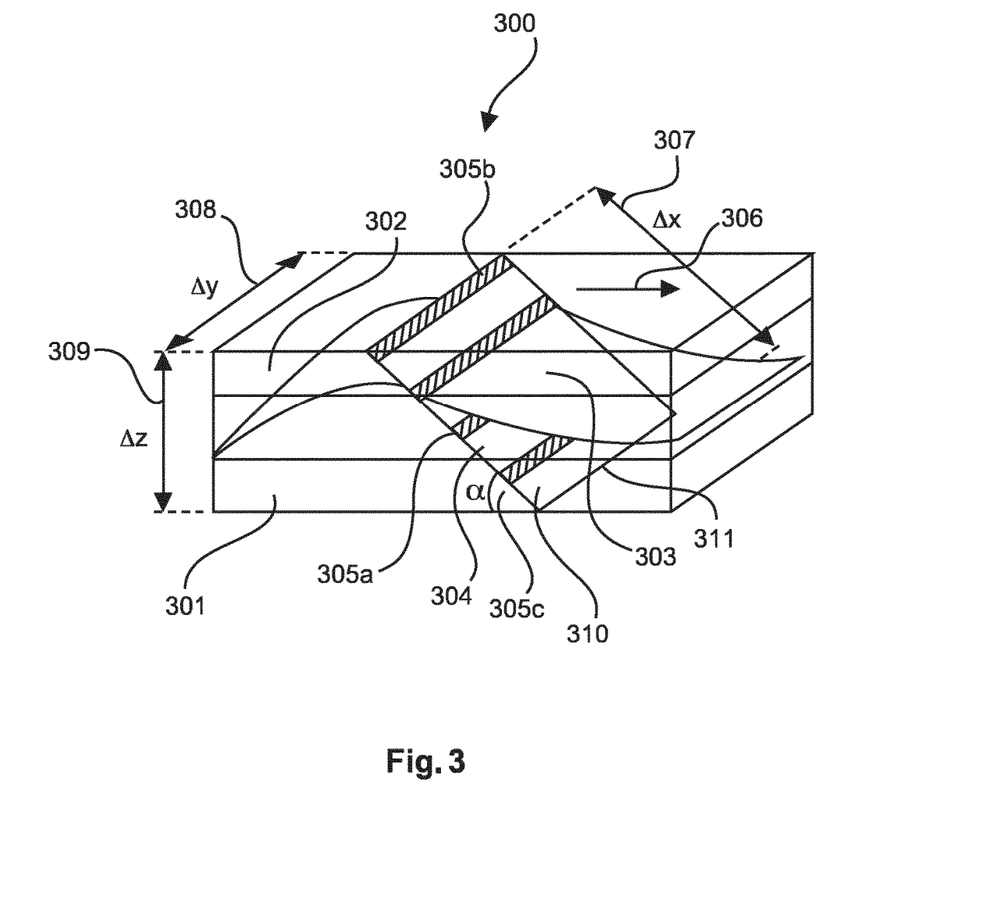
FIG. 3 shows a projection of an imaging sensor in object space according to an exemplary embodiment of the present invention.

Moreover, the imaging sensor of the present invention may of course also comprise third, fourth, fifth and even more pixel lines all extending along the Y direction and may also comprise a second, third, fourth and even more non-photosensitive gaps between those pixel lines. Further, pluralities of pixel lines can be positioned contiguously such that they build a contiguous surface extending along the X and Y direction and constitute a pixel block as shown in FIGS. 3 and 4. In a tilted configuration said non-photosensitive areas, i.e. the gaps, might not be needed for imaging without reducing the in image quality by providing the gaps between the imaging areas. Thus, the present invention is of particular advantages when the imaging sensor is applied, e.g. in a scanning imaging system, in a tilted configuration.

According to another exemplary embodiment of the present invention, the tilt angle of the imaging sensor is in the range of, preferably about 60°.

Here the tilt angle means the angle between the X direction and the Z direction. The scanning imaging system can image an oblique cross section of a sample. According to another exemplary embodiment of the present invention, in an individual pixel the read out lines are elevated above the photodiode.

The read out lines can be configured as metal lines or as wires on the chip of the imaging sensors and they can be elevated above the photodiode. In practice, on an imaging sensor, the photodiode is the lowest part, and all electronics and connection lines can be elevated. Therefore, in case light is not coming directly from above, as is the case with a tilted sensor configuration described herein, the elevated parts cast a shadow on the photodiode, thus reducing the amount of light captured, thus reducing the image quality. Because in the sensor of this exemplary embodiment of the present invention fewer read out lines are needed in the pixel compared to the pixels of a conventional image sensor, it is possible to have only vertical read out lines. Such vertical read out lines run along the X direction which is substantially perpendicular to the Y direction. As only read out lines parallel to the X axis can be provided by the present invention, there is no disadvantage when tilting the sensor with respect to the optical axis by a rotation around the Y axis of the sensor. This means that the light falls on the sensor perpendicular to the Y axis of the sensor, but with an angle, of, for example, 60°, with the X axis. This can easily be gathered from, for example, FIG. 3. Because the read out lines in this embodiment described herein run parallel to the X axis of the sensor, these read out lines do not cast a shadow and thus do not reduce the image quality, which is an important advantage over prior art sensors using pixels 601. With both horizontal and vertical read out lines 605-608 as used in pixels 601 of a conventional 2D sensor shown in FIG. 6, this would not be possible and there would always be a shadow on the photodiodes in a tilted configuration. Consequently, the exemplary embodiment of the present invention described herein before further increases the light sensitivity and the image quality. According to another exemplary embodiment of the present invention the imaging sensor is a self focusing sensor. A control module can be provided which controls the imaging sensor to carry out a self focusing. This can avoid the need of other focusing means like, for example, focusing maps.

According to another exemplary embodiment of the invention, the first non-photosensitive gap has a width of at least one width of a pixel of the sensor. The pixel width is shown in FIG. 400 with reference sign 420. If the imaging sensor has a plurality of non-photosensitive gaps, see. e.g. FIG. 3, all gaps may have a width said at least one width of a pixel of the sensor. In many applications, a larger width can be useful to provide enough space for the integration of the read out electronics of the photodiodes of the pixels. For example, four, five or six times the pixel width may be an appropriate width of the gap. In this context it should be noted that the width is defined along the X direction of the XY coordinate system of the 2 array of pixels. According to an exemplary embodiment of the present invention, an optimized width of the gaps of the sensor as compared to the width of the photosensitive blocks of pixels lines, i.e., the TDI blocks, is provided and will be explained in detail later on.

According to another exemplary embodiment of the present invention, at least one of the following components is positioned in the first or a further non-photosensitive gap. The current voltage converters of pixels of at least one of the first and the second pixel line, a logic of the imaging sensor and a connective circuitry of the imaging sensor may be positioned within the photosensitive gap of the imaging sensor of the present invention. According to another exemplary embodiment of the invention, a plurality of charge voltage converters is associated with each photodiode of the imaging sensor and each charge voltage converter is positioned in the first non-photosensitive gap of the imaging sensor or in a further non-photosensitive gap of the imaging sensor.

Figure 6:
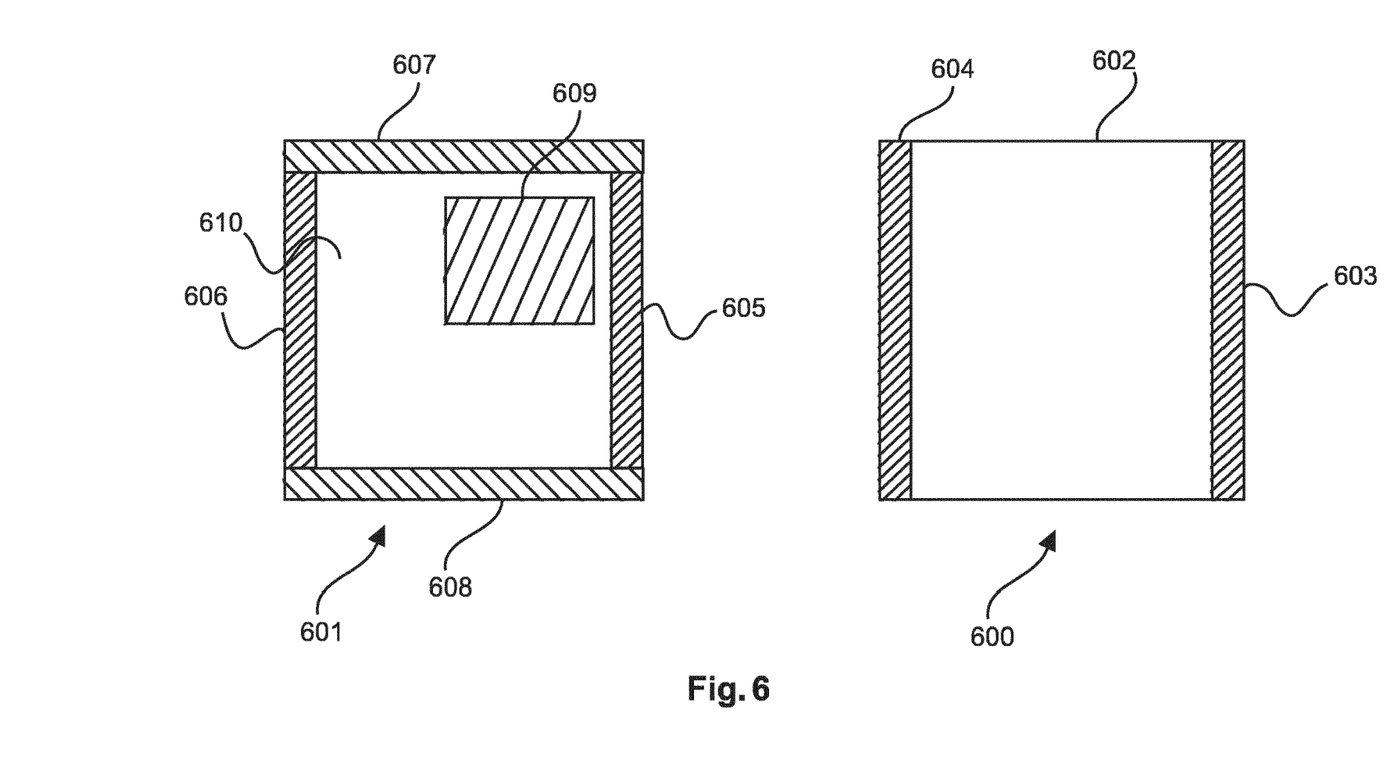
FIG. 6 schematically shows a comparison between a prior art pixel and a pixel of the image sensor of an exemplary embodiment of the present invention.

As can be gathered, for example, from FIG. 6, the pixel design of the present invention provides for pixels which consist of a photodiode. In contrast to a prior art pixel 601, the charge voltage converters connected to the photodiodes of pixels of the present invention are no part of the pixel itself, but are located somewhat distant in one of the gaps of the imaging sensor. In this context, it should be noted that the read out lines of a pixel of the imaging sensor of the present invention are typically elevated above the photodiode. In practice, in the image sensor, the photodiode is the lowest part and the shown read out lines 603 and 604 of FIG. 6 are elevated. Therefore, the terminology is used herein that the pixel 600 of the image sensor of the present invention consists of the photodiode 602. It should be noted, that in the context of the present invention such a further non-photosensitive gap may be provided in parallel and/or over the complete width of the 2D array of pixels along the Y direction. Thus, according to another exemplary embodiment, the first non-photosensitive gap extends along the Y direction. According to another exemplary embodiment of the present invention, the imaging sensor comprises a plurality of non-photosensitive gaps that each extend along the Y direction over the whole width of the 2D array of pixels.

According to another exemplary embodiment of the present invention, each pixel of the sensor comprises only two read out lines. The two read out lines may be parallel or substantially parallel to the X axis as defined, inter alia, in FIG. 3.

According to another exemplary embodiment of the present invention, the first pixel line is part of a first block that consists of several adjacent pixel lines which lines extend along the Y direction. Further, the second pixel line is part of a second block that consists of several adjacent pixel lines which lines extend along the Y direction. Furthermore, the first and second blocks are separated from each other by the non-photosensitive gap extending along the Y direction.

In an exemplary embodiment, the imaging sensor comprises 128 of such blocks in X direction. Of course, also more or less blocks of a plurality of adjacent pixel lines can be applied by the skilled person.

In particular, such pixel line blocks can be used as time delay integration (TDI) blocks. A TDI block may be seen as a 2D array of pixels with lines extending along the Y direction, and the columns extending along the X direction. The TDI action takes place along the columns. This TDI action can be either a conventional CCD fashion TDI, where the charge is transferred along the columns synchronized with the motion of the object with respect to the sensor. Alternatively, TDI in the digital domain may be used, where the pixel charges are first converted to a digital number, and then transferred into the digital domain synchronized with the motion of the object with respect to the sensor. This digital TDI can take place on the image sensor itself or "off-chip" in a computational unit such as an FPGA or in a computer. Both TDI aspects are part of the present invention. A more detailed example of using TDI according to such embodiments of the present invention will be explained in the context of FIG. 4.

According to another exemplary embodiment of the invention, a control module is provided which is configured to control the imaging sensor in line with the principles of TDI, for example in line with the two TDI procedures defined before. According to another exemplary embodiment of the invention, besides the first and second blocks the sensor comprises also further blocks of several adjacent pixel lines extending along the Y direction. Each block consists of n adjacent pixel lines, wherein n is an integer and wherein the following relation holds true: $2 \leq n \leq 8$, particularly $n=4$.

According to another exemplary embodiment of the invention, each non-photosensitive gap of the imaging sensor between the pixel lines or between the blocks has a width of at least m widths of a pixel of the sensor wherein m is an integer. Furthermore, the following relation holds true: $8 \leq m \leq 20$, particularly $m=13$.

The inventors of the present invention found out that there is a trade off with taking the read out electronics out of the pixels. Moving the read out electronics too far away from the photosensitive part of the pixel might lead to degradation of the image quality due to noise and coupling in the long lines. However, having the read out electronics in the pixel leads to a reduction of the size of the photosensitive part of the pixel, i.e., the fill factor, also leading to a degradation in image quality. The range disclosed here is an optimum between the fill factor, distance between the photosensitive area of the pixel and the read out electronics and depth resolution when using the sensor as a tilted three-dimensional and/or auto focus sensor. In particular, using 4 lines of TDI pixels and a 13 pixel wide gap between the TDI blocks was found to provide an optimal combination taking into account the previously described trade off. However, the number of rows of one TDI block may vary between 2 and 8 and the width of the gaps between said TDI blocks may vary between 8 and 20 pixels according to this exemplary embodiment.

According to another exemplary embodiment of the present invention, the imaging sensor does not comprise microlenses. Avoiding microlenses is important for placing the sensor tilted in the optical path of, for example, scanning image system or a digital scanning microscope. Moving the read out electronics, the logic and connective circuitry of the sensor into the gaps between the photoactive lines of pixels increases or maximizes the fill factor such that during low light conditions, no complicated and error-prone microlenses are needed.

According to another exemplary embodiment of the present invention, each non-photosensitive gap of the imaging sensor has a width of at least 1 width of a pixel of the sensor.

According to another exemplary embodiment of the present invention, the scanning imaging system is a digital scanning microscope for imaging a sample.

According to another exemplary embodiment of the present invention, the use of an imaging sensor according to any of the previously and subsequently described embodiments is presented wherein the imaging sensor is used to generate an image of a pathological sample.

It may be seen as a gist of the invention to provide for an imaging sensor that comprises gaps between the photosensitive pixel lines, which gaps are not photosensitive and which comprise the read out electronics of the pixels. Moreover, a novel imaging sensor design is presented basically consisting of multiple TDI line sensors on a single die, covering the same area as a conventional two-dimensional image sensor used in a tilted path. In an embodiment, the sensor comprises a combination of multiple TDI line sensors on a single die. It is characterized in that the TDI line sensors are separated by a gap filled with the logic and connective circuitry of the sensor. The principles laid out herein may be especially applied in self focusing sensor having said gaps for the electronic circuitry, like inter alia the CVCs associated to the photodiodes.

These and other features of the invention will become apparent from and elucidated with reference to the embodiments described hereinafter.

BRIEF DESCRIPTION OF THE DRAWINGS

Exemplary embodiments of the invention will be described in the following drawings.

DETAILED DESCRIPTION OF EMBODIMENTS

In the following, another exemplary, non-limiting embodiment of the present invention is provided by means of an imaging sensor which is described in thorough detail in the following table. Therein, the gap is described as "Gap Region" and is named "Pixel Pitch", being the 13 pixel wide gap as described before. The pixels are rectangular as they are 5.56 micrometer long in Y direction and 6.42 micrometer in X direction, as can be seen from the following table.

| Parameter | Typical | Unit |
| --- | --- | --- |
| Pixel Size y | 5.56 | um |
| Pixel Size x | 6.42 | um |
| Pixel Pitch x (TDI) | 6.42 | um |
| Pixel Pitch x (Gap region) | 83.46 (13 pixel) | um |
| Number of pixels in x direction (per TDI block) | 4 | |
| Number of pixels in y direction | 4096 | |
| Number of TDI blocks in x direction | 128 | |
| Number of dark and test pixels x (per TDI block) | 4 | |
| Number of dark and test pixels x (total) | 513 | |
| Number of dark and test pixels y (per side) | 32 | |
| Number of dark and test pixels y | 64 | |

-continued

| Parameter | Typical | Unit |
| --- | --- | --- |
| Total number of effective pixels per line | 4096 | |
| Total number pixels on Matrix | 4160 × 513 | |
| DSNU | 1% | |
| PRNU | 2% | |
| Geometrical Fill Factor | 79% | |
| ADC resolution | 9 bit, no missing codes, monotonic | |
| Full Well capacity | 60 | ke− |
| Total QE | 47% | |
| SNR linear without TDI (saturation over read noise) | 54 | dB |
| Electrical Read noise RMS | 1 | DN |

Figure 2:
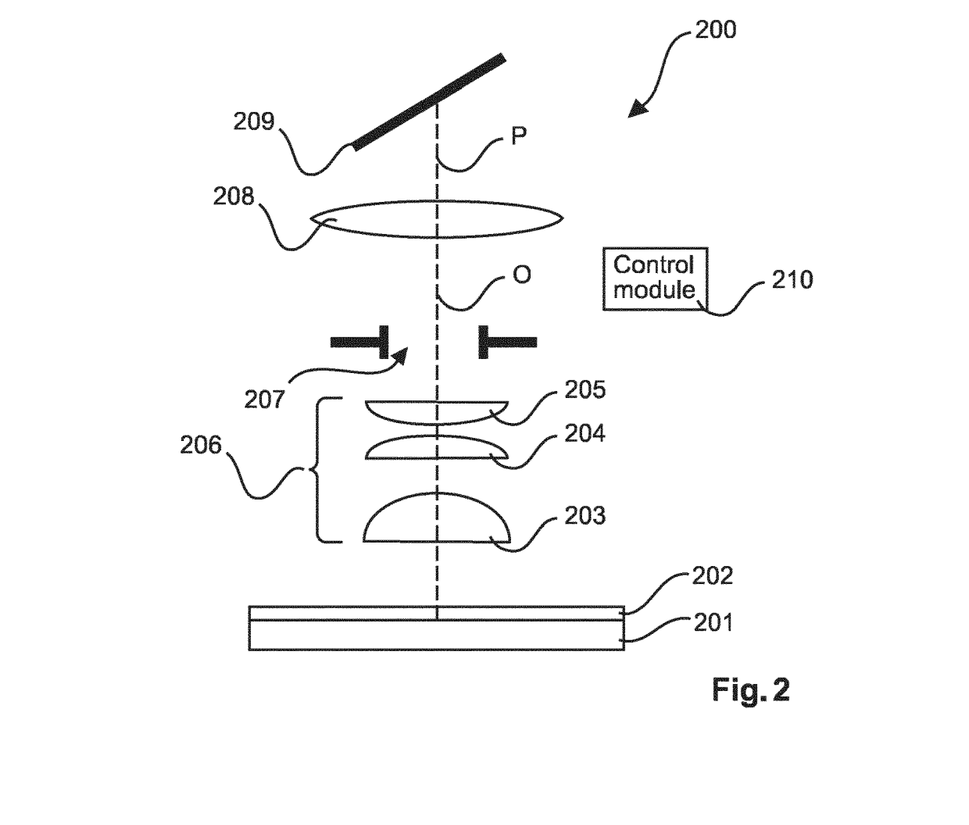
FIG. 2 schematically shows a scanning microscope according to an embodiment of the present invention.

According to another exemplary embodiment of the present invention a scanning microscope 200 is shown within FIG. 2. This scanning imaging system is arranged for imaging a sample, e.g. a tissue layer which is not shown, which can be placed between the glass side 201 and the cover slit 202. The sensor of the present invention and the imaging system of the present invention allow for a fast image acquisition especially of not perfectly flat and/or volumetric samples. In particular, digital slide scanners for digital pathology may take advantage of the present invention. Imaging path P may comprise a microscope objective 206 which may comprise one or more lenses 203, 204 and 205, an aperture 207 for blocking unscattered reflected light from the tissue sample, a tube lens 208 and an imaging sensor 209 according to the present invention. Imaging sensor 209 comprises a 2D array of pixels that can also be referred herein as a matrix of pixels. For example, the sensor is a CMOS imaging sensor but also other kinds of sensors can be used with the present invention. As can be seen from FIG. 2, imaging sensor 209 is tilted with respect to the optical axis o of the microscope objective lens. The imaging sensor 209 may be a self-focusing imaging sensor as explained herein. The system 200 further comprises a control module for controlling the operating process of the scanner, and in particular the scanning process for imaging the sample. The control module typically comprises a processor such as, for example, an FPGA (Field Programmable Gate Array) or a DCP (Digital Signal Processor). It should be noted, that the optical axis O can be parallel to the axis Z 309 that is defined in the following FIG. 3.

FIG. 3 shows a projection 300 of an imaging sensor 311. Moreover, also imaging sensor 311 may be a self-focusing imaging sensor. FIG. 3 shows that the imaging sensor 311 comprises several TDI blocks 304, 310 that respectively comprise a plurality of parallel pixel lines running along the Y direction shown with axis 308. The TDI blocks 304 and 310 are separated by a non-photosensitive gap 305c, in which the read out electronics of the pixels of at least one of said blocks are positioned. If desired, the read out electronics of both TDI blocks 304 and 310 can be positioned in the gap 305c. However, it is also possible, that the read out electronics of the pixels of block 310 are positioned in the non-photosensitive gap 305c and that the read out electronics of the pixels of block 304 are positioned in non-photosensitive gap 305a. Apparently it is possible to provide TDI blocks 304 and 310 as a line of pixels which do not comprise charge to voltage converters and/or logics and/or connective circuitries. The latter components are entirely comprised by said non-photosensitive gaps of the imaging sensor 311 such that a maximization of the fill factor is achieved with a proper low light sensitivity is achieved. It should be noted, that the TDI blocks 304 and 310 are only illustrated schematically such that the plurality of adjacent pixel lines is not depicted here in detail. Such individual pixel lines constituting the TDI block may be gathered from following FIG. 4. Also the gaps 305a, 305b, and 305c are only schematically drawn within FIG. 3. 301 denotes a glass slide and 302 denotes a cover slip and the tissue sample is shown with 303. Moreover, the scan direction is depicted with arrow 306 and it can easily be gathered that the scan direction 306 is substantially perpendicular to the Y direction 308 defining the 2D array of pixels of sensor 311. X direction 307 is also shown in FIG. 3.

The imaging sensor of FIG. 3 has a two-fold improvement over a conventional 2D sensor of the same size and resolution. Maximization of the photoactive part of the pixels in the photosensitive area of the sensor is provided such that the fill factor is maximized. This allows for a sensitive sensor without microlenses. Avoiding microlenses is important for placing the sensor tilted in the optical path of, for example, a scanning imaging microscope. Furthermore the gaps 305a, 305b, and 305c allow for a faster read out because more circuitry can be on the sensor in the gaps allowing for a faster sensor.

FIG. 4 schematically shows an imaging sensor 400 according to an exemplary embodiment of the present invention. The imaging sensor comprises a 2D array of pixels 421. The 2D array of pixels comprises a first pixel line 410 which comprises a plurality of pixels, for example pixels 415, 416, 417. As can be gathered from FIG. 4, the first pixel line 410 extends along the Y direction 422 from the left end of the array to right end if the array, thus it extend over the whole breath of the array. The Y direction is perpendicular to the X direction 423. The 2D array of pixels further comprises a second pixel line 411 comprising a plurality of pixels, pixels 418 and 419 are exemplarily shown with reference signs. Also the second line 411 extends also along the Y direction 422. Furthermore, a first non-photosensitive gap 402 between the first and the second pixel lines is provided. As can be gathered from FIG. 4, this gap also extends along the Y direction. Moreover, read out electronics 412 and 413 of pixels of the first line and/or of pixels of the second pixel line are positioned within the first non-photosensitive gap 402. The pixels 407 to 411 of FIG. 4 may of the type of pixel 600 shown in FIG. 6. Notably, all embodiments of imaging sensors described herein may consist of pixels which hare of the type shown as 601 in FIG. 6. Of course components, like e.g. an FPGA, may be comprised by the sensor.

The first non-photosensitive gap 402 has a width of at least one width 420 of a pixel of the sensor. In this embodiment, the gap width is approximately five times the width 420 of one pixel of the sensor. Also the second non-photosensitive gap 403 has such a width. Moreover, as can be gathered from FIG. 4, a first block 405 of several adjacent pixel lines 407 to 410 are comprised by the imaging sensor 400. This first block 405 can be controlled according to the present invention as a TDI block. The first non-photosensitive gap 402 comprises read out electronics 412, 413 such as current voltage converters of the pixel line 410 or of line 411 and may also comprise a logic of the imaging sensor 400 and/or a connective circuitry of the imaging sensor 400. Also the second non-photosensitive gap 403 comprises such read out electronics 414 of pixels of the second TDI block 404 and of third TDI block 406. As has been described before, the imaging sensor 400 can also be provided such that the read out electronics of a TDI block are completely provided within the adjacent gap below or above said TDI block along the shown X direction 423. As will become apparent from and elucidated with the explanations given in the context of FIG. 6, it is possible thereby, to provide for a TDI block that consists entirely of photodiodes but does itself not comprise read out electronics as they are moved to neighbored gaps. In another exemplary embodiment the sensor has 128 of such blocks 404, 405, and 406 of pixel lines and has 127 or 128 gaps.

A TDI block may be seen as 2D array of pixels with the lines/rows extending along the Y direction, and the columns extending along the X direction. The TDI action takes place along the columns. This TDI action can either be a conventional CCD fashion TDI, where the charge is transferred along the columns synchronized with the motion of the object with respect to the sensor. Alternatively, TDI in the digital domain can be carried our, where the pixel charges are first converted to a digital number, and then transferred in the digital domain synchronized with the motion of the object with respect to the sensor. This 'digital' TDI can take place on the image sensor itself, or 'off-chip', in a computational unit such as an FPGA or computer. The system of the present invention may also comprise a control module which controls the read out of the imaging sensor such that the desired TDI procedure takes place.

A more detailed example of using TDI according to such embodiments is explained in the context of FIG. 4. In FIG. 4, three blocks 404, 405 and 406 of four TDI stages (e.g. 407, 408, 409, 410) are designated in the pixel matrix. Note that a TDI block is meant to be a sub-array of the total pixel matrix, which acts as a functional TDI unit. A person skilled in the art will derive in an obvious manner how a TDI sensor according to such embodiments may operate. Some embodiments will be described herein by way of non limitative examples. All of them are applicable to both of the two dominant imaging sensor types, i.e. CCD and CMOS image sensors. For CCD image sensors the TDI action is typically executed in the analog domain, by copying charge from one set of pixels to another set of pixels. For CMOS image sensors, the TDI action is typically performed in the digital domain, by adding the digital value of one set of pixels to the digital value of another set of pixels. However, digital and analog TDI can both be applied to either of CCD and CMOS.

In the following the TDI action is described as a pixel value transfer, which is to be understood as an analog charge transfer if analog TDI is employed, and as a pixel value transfer if digital TDI is employed.

Turning back to the example of FIG. 4, the sensor is moved to a scan position further with respect to the microscope slide while a pixel value is transferred. In the example of FIG. 4 it will be assumed that the TDI action works upward and the translation of the sample with respect to the sensor is made upward too. Pixel line or stage 410 (a stage preferably includes a full line of pixels) starts with pixel values of 0 for each exposure, and pixel values from stage 407 make up the final image in block 405 after each exposure. When following a single line of the image of the sample during a full TDI cycle, the process, which is known in the art, is as follows: during an exposure at a time t=0, an image of the sample is captured by the imaging sensor. At the next exposure at t=1, the sample is translated such that the part of the image of the sample projected at t=0 on stage 410 is now projected on stage 409. Between exposures t=0 and t=1, the values of the pixels in stage 410 are copied to stage 409. During the exposure at t=1, the pixel values resulting from the exposure on stage 409 are added to the already present values, which resulted from the exposure at stage 410 at t=0. The values in stage 409, are now the sum of the pixel values resulting from the exposure of stage 410 at t=0 and the exposure of stage 409 at t=1. Between exposures t=1 and t=2, the values of the pixels in stage 409 are copied to stage 408. During the exposure at t=2, the pixel values resulting from the exposure on stage 408 are added to the already present values, which resulted from the exposure at stage 410 at t=0 plus the exposure at stage 409 at t=1. The values in stage 408, are now the sum of the pixel values resulting from the exposure of stage 410 at t=0 and the exposure of stage 409 at t=1, and the exposure of stage 408 at t=2. Between exposures t=2 and t=3, the values of the pixels in stage 408 are copied to stage 407. During the exposure at t=3, the pixel values resulting from the exposure on stage 407 are added to the already present values, which resulted from the exposure at stage 410 at t=0 plus the exposure at stage 409 at t=1, and stage 408 at t=2. The values in stage 407, are now the sum of the pixel values resulting from the exposure of stage 410 at t=0 and the exposure of stage 409 at t=1, and the exposure of stage 408 at t=2, and the exposure of stage 407 at t=3. Because the image of the sample is translated over the sensor in the same direction, and at the same speed as the TDI action, in this example four equal exposures have been made of the same area on the sample. This is equivalent to a four times longer exposure period without slowing down the translation of the sample and without introducing additional motion blur. The above description applies as well to any other blocks such as blocks 404 and 406 or any further block of the imaging sensor of the present invention.

It is to be noted that in such embodiments the four stages of the TDI blocks may be able to capture an image of the same area at same focus.

Accordingly, the stages of each TDI block may be such that they are separated from the sample by the same distance, approximately.

For example by referring back to the first detailed implementation described above, four stages can be used for each block. Thus, each of the TDI blocks may be constituted by four lines of pixels positioned next to each other with a pitch having the same size as the pixel size. It is to be noted here that a pitch may refer to the distance between the centers of two neighboring pixels. Each TDI block in each embodiment of the present invention may be spaced apart by a non-photosensitive gap distance larger than the pitch. The gap distance determines the Z resolution of the depth positioning of the sensor. It may be advantageous to have a relatively large gap, while having the individual pixels of each TDI block closer together. In this manner a relatively large Z range can be obtained without using too many pixels, because the individual stages of each TDI stage are closer together. As a result they acquire at similar depth and thus reduce image softening due to defocus of one or more stages.

Figure 5:
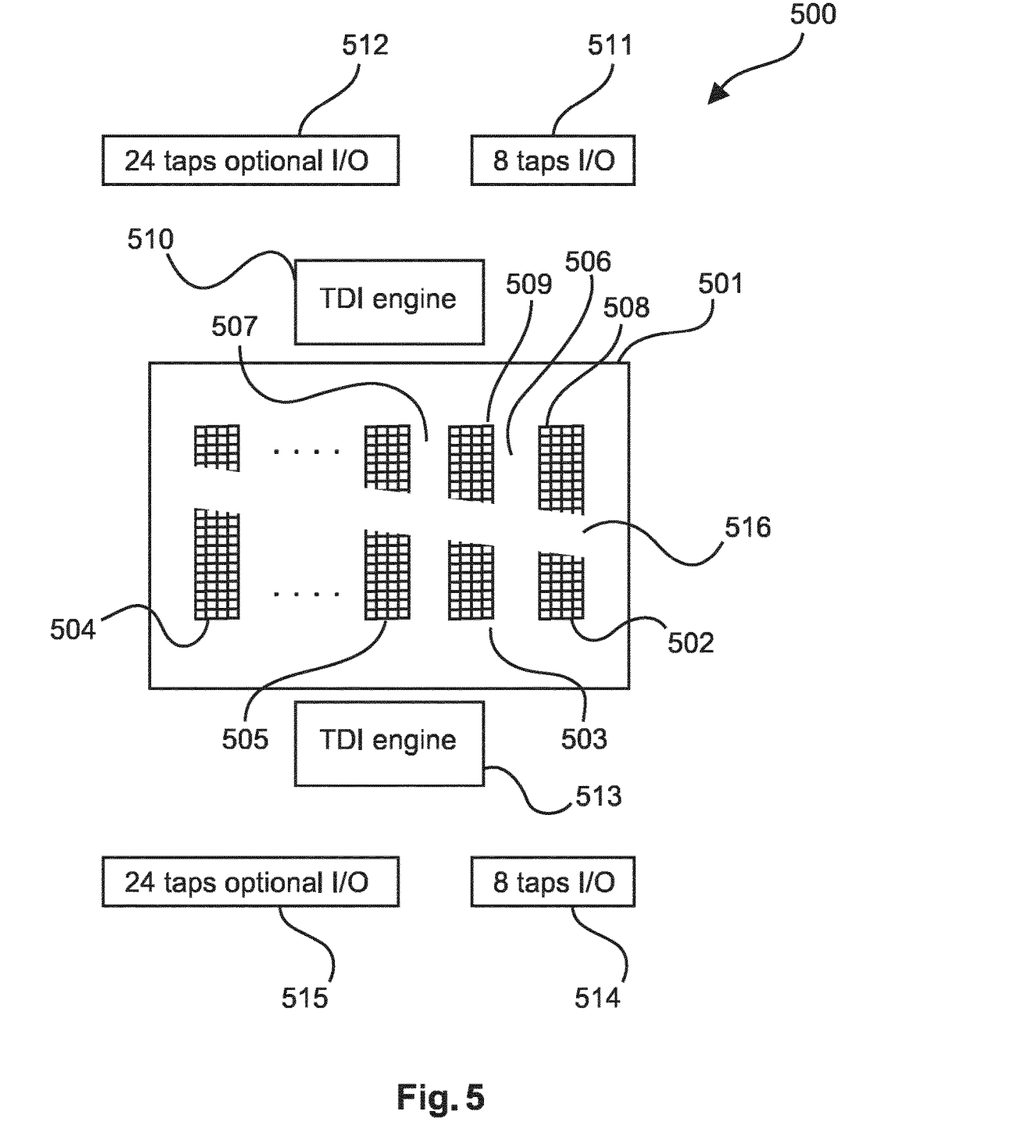
FIG. 5 schematically shows a setup with an imaging sensor according to an exemplary embodiment of the present invention.

According to another exemplary embodiment of the present invention, FIG. 5 shows a setup 500 with an imaging sensor 501 that comprises a first pixel line 508 and a second pixel line 509 that are separated by the non-photosensitive gap 506. First TDI block 502, second TDI block 503, third TDI block 505 and 128th TDI block 504 respectively comprise four lines of pixels. Interruption 516 is shown for the pixel lines as pixel lines are much longer than shown here in FIG. 5. As has been described before, the pixel lines may consist of several thousand pixels, for example, 4000 or more pixels.

FIG. 5 shows also shows two TDI engines 510, 513 which are positioned on the imaging sensor and are thus part of the imaging sensor. Such a TDI engine is configured to carry out any of the know and herein mentioned TDI procedure. In this way, TDI is done on the chip. Also other embodiments are comprised by the present invention, in which the TDI procedure is carried out off the chip, for example by an external computer. The eight input and output taps 511 and 514 are the standard pins for connecting the sensor to a databus. Optionally, the 24 input and output taps 512, 515 can be used in case a higher bandwidth is desired by the user.

According to another exemplary embodiment of the present invention, FIG. 6 shows a pixel 600 which consists of a photodiode 602. Further, vertical read out lines 603 and 604 are shown in FIG. 6 which, however, are elevated above the photodiode 602. In contrast thereto, a prior art pixel 601 is shown on the left-hand side of FIG. 6 which comprises four read out lines 605, 606, 607 and 608. The prior art pixel 601 needs horizontal and vertical read out lines. Moreover, it can be gathered from pixel 601 that the photosensitive area 609 is only a part of the surface of the pixel whereas a large amount of the surface is needed for the use of read out electronics 610, like a plurality of CVCs. In the conventional pixel 601, the pixel electronics are typically embedded in the pixel itself leading to a low fill factor. This means that the pixel has three transistors (rolling shutter) of four transistors (global shutter) for the CVC and both vertical and horizontal metal lines for addressing and read out are needed. All these elements take away space from the pixel's photoactive area 609 leading to a lower fill factor of pixel 601 as compared to the pixel 600 used in the present invention.

Thus, a new sensor pixel layout is provided according to the present invention. The gap region between the TDI blocks (not shown here) can then contain all the read out electronics, e.g. the CVCs that convert the charge of the photodiode to a proportional voltage. This means that the pixel 600 itself has only vertical metal lines 603 and 604 for read out and addressing. So only the vertical metal lines take away from the photoactive area, leading to a high fill factor. The fact that there are only vertical lines is an additional advantage because the tilt of the imaging sensor of the present invention, for example in an imaging system of FIG. 2, is along the horizontal, i.e. a rotation around the Y axis, which means that the metal lines do not cast a shadow on the photodiodes. A desired plurality of pixels 600 of FIG. 6 may be used to constitute the pixel lines of the present invention. For example, a plurality of pixels 600 may be used to build the blocks 404, 405 and 406 of pixels of sensor 400 in FIG. 4 or of the sensor in FIG. 3.

Other variations to the disclosed embodiments can be understood and effected by those skilled in the art in practising the claimed invention, from the study of the drawings, the disclosure, and the appended claims. In the claims the word "comprising" does not exclude other elements or steps and the indefinite article "a" or "an" does not exclude a plurality. A single processor or other unit may fulfil the functions of several items or steps recited in the claims. The mere fact that certain measures are recited in mutually different dependent claims does not indicate that a combination of these measures cannot be used to advantage. Any reference signs in the claims should not be construed as limiting the scope of the claims.

The invention claimed is:

1. A scanning imaging system having an optical axis along the Z direction and comprising an imaging sensor comprising a 2D array of pixels in an orthogonal XY coordinate system, the Z direction is perpendicular to the Y direction, the 2D array of pixels comprising a first pixel line comprising a plurality of pixels, wherein the first pixel line extends along the Y direction,
a second pixel line comprising a plurality of pixels,
wherein the second pixel line extends along the Y direction,
wherein each pixel of the imaging sensor consists of a photodiode and comprises read out lines along the X direction,
wherein in an individual pixel the read out lines are elevated above the photodiode,
a first non-photosensitive gap between the first and the second pixel lines,
wherein read out electronics of pixels of the first pixel line and of pixels of the second pixel line are positioned in the first non-photosensitive gap,
and
wherein the imaging sensor is tilted around the Y axis as an axis of rotation.

2. A scanning imaging system having an optical axis along the Z direction and comprising an imaging sensor comprising a 2D array of pixels in an orthogonal XY coordinate system, the Z direction is perpendicular to the Y direction, the 2D array of pixels comprising
a first pixel line comprising a plurality of pixels,
wherein the first pixel line extends along the Y direction,
a second pixel line comprising a plurality of pixels,
wherein the second pixel line extends along the Y direction,
wherein each pixel of the imaging sensor consists of a photodiode and comprises read out lines along the X direction,
wherein in an individual pixel the read out lines are elevated above the photodiode,
a first non-photosensitive gap between the first and the second pixel lines,
wherein read out electronics of pixels of the first pixel line or of pixels of the second pixel line are positioned in the first non-photosensitive gap
wherein the imaging sensor is tilted around the Y axis as an axis of rotation.

3. A scanning imaging system according to claim 1, wherein the tilt angle of the imaging sensor is in the range of, preferably about 60°.

4. A scanning imaging system according to claim 1, wherein the first non-photosensitive gap extends along the Y direction.

5. A scanning imaging system according to claim 4, wherein at least one of the following components is positioned in the first non-photosensitive gap or in a further non-photosensitive gap of the sensor:
current voltage converters of pixels of at least one of the first and the second pixel line,
a logic of the imaging sensor, and
a connective circuitry of the imaging sensor.

6. A scanning imaging system according to claim 5,
wherein a plurality of charge voltage converters is associated with each photodiode of the imaging sensor, and
wherein each charge voltage converter is positioned in the first non-photosensitive gap of the imaging sensor or in a further non-photosensitive gap of the imaging sensor.

7. A scanning imaging system according to claim 1,
wherein each pixel of the sensor comprises only two read out lines.

8. A scanning imaging system according to claim 7,
wherein the first pixel line is part of a first block that consists of several adjacent pixel lines extending along the Y direction,
wherein the second pixel line is part of a second block that consists of several adjacent pixel lines extending along the Y direction, and
wherein the first and second blocks are separated from each other by a non-photosensitive gap extending along the Y direction.

9. A scanning imaging system according to claim 8,
wherein the image sensor comprises further blocks,
wherein neighbored blocks are separated from each other by a non-photosensitive gap extending along the Y direction,
wherein each block consists of n adjacent pixel lines and wherein n is an integer, and
wherein 2≤n≤8, particularly n=4.

10. A scanning imaging system according to claim 8,
wherein each non-photosensitive gap of the image sensor has a width of at least m widths of a pixel of the sensor and wherein m is an integer, and
wherein 8≤m≤20, particularly m=13.

11. A scanning imaging system according to claim 8,
wherein the image sensor does not comprise microlenses.

12. A scanning imaging system according to claim 8,
wherein the each non-photosensitive gap has a width of at least one width (420) of a pixel of the sensor.

13. A scanning imaging system according to claim 12,
wherein the scanning imaging system is a digital scanning microscope for imaging a sample.

14. Use of a scanning imaging system according to claim 12 to generate an image of a pathology sample.

* * * * *